No. 841,251. PATENTED JAN. 15, 1907.
W. HOUGHTON.
COT OR HAMMOCK HOOK AND BEAM SOCKET.
APPLICATION FILED APR. 23, 1906.
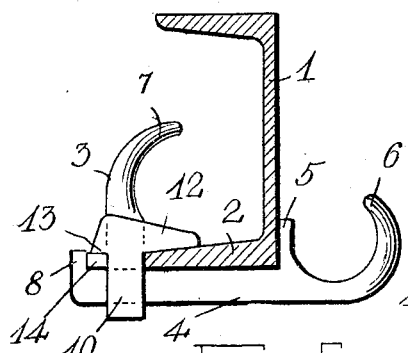
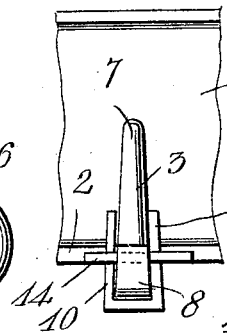
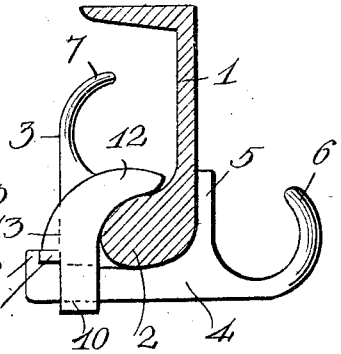
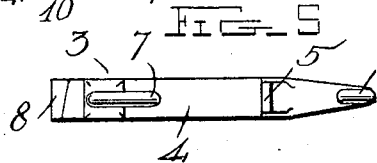
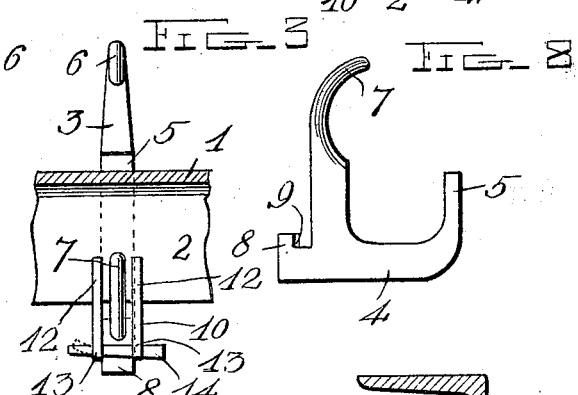
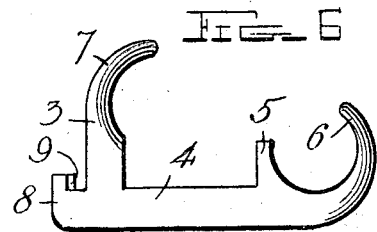
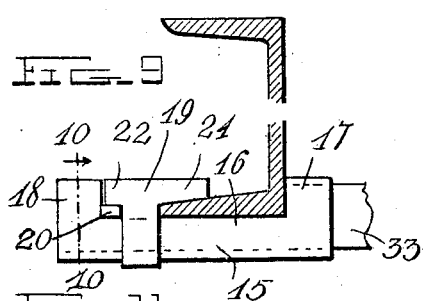
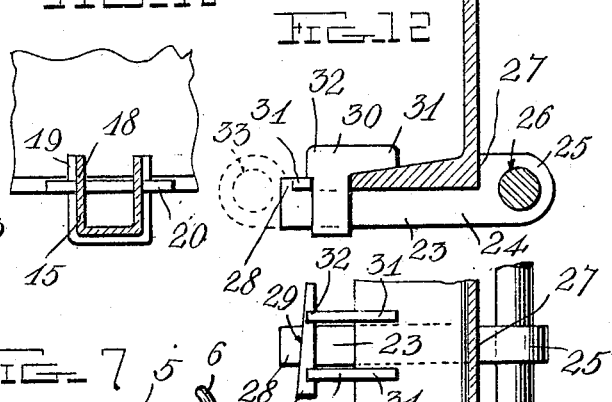
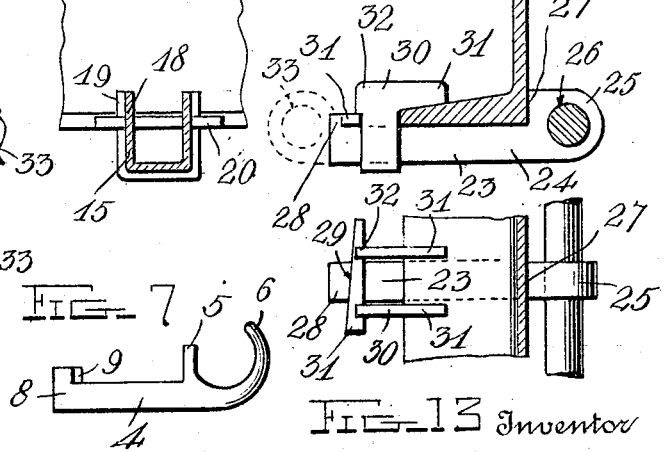
Witnesses
C. H. Griesbauer
Inventor
William Houghton
by H. B. Willson &co.

UNITED STATES PATENT OFFICE.

WILLIAM HOUGHTON, OF BATH, MAINE.

COT OR HAMMOCK HOOK AND BEAM-SOCKET.

No. 841,251.        Specification of Letters Patent.        Patented Jan. 15, 1907.

Application filed April 23, 1906. Serial No. 313,279.

*To all whom it may concern:*

Be it known that I, WILLIAM HOUGHTON, a citizen of the United States, residing at Bath, in the county of Sagadahoc and State of Maine, have invented certain new and useful Improvements in Cot or Hammock Hooks and Beam-Sockets; and I do declare the following to be a full, clear, and exact description of the invention, such as will enable others skilled in the art to which it appertains to make and use the same.

This invention relates to improvements in cot or hammock hooks and beam-sockets and means to secure the same to a beam.

The object of the invention is to provide a cot or hammock hook and other supporting devices and means whereby said hook or supporting devices may be quickly attached to a beam or similar support.

With the above and other objects in view the invention consists of certain novel features of construction, combination, and arrangement of parts, as will be hereinafter described and claimed.

In the accompanying drawings, Figure 1 is a cross-sectional view of a beam, showing the application of the invention thereto. Fig. 2 is a side view of the beam, showing a rear end elevation of the hook. Fig. 3 is a horizontal sectional view through the beam, showing a top plan view of the hook and means for attaching the same. Fig. 4 is a view similar to Fig. 1, showing a modified form of the attaching device. Fig. 5 is a plan view of the hook. Fig. 6 is a side view of the same. Figs. 7 and 8 are similar views showing modified forms of the hook. Fig. 9 is a view similar to Fig. 1, showing a beam-socket attached to a beam in accordance with the invention. Fig. 10 is a sectional view of the same on the line 10 10 of Fig. 9. Fig. 11 is a top plan view of the device shown in Figs. 9 and 10, the beam being shown in horizontal section. Fig. 12 is a view similar to Fig. 1, showing an apertured-rod-supporting bar attached to the beam in accordance with the invention; and Fig. 13 is a top plan view of the same, showing the beam in horizontal section.

Referring more particularly to Figs. 1 to 8 of the drawings, 1 denotes the beam, which is here shown as a channel-iron beam, to the lower flange or rib 2 of which is adapted to be secured the hook 3, said hook comprising a beam-engaging bar or shank 4, on the forward end of which is formed an upwardly-projecting lug 5 and a hook 6. The lug 5 is formed at right angles to the shank 4 and is adapted to engage the flat side of the beam 1, as shown. On the upper side of the bar or shank 4, adjacent to its inner end, is formed an upwardly-projecting hook 7, and on the extreme end of the shank 4 is formed an upwardly-projecting lug 8. Said lug has an obliquely-disposed inner wall, as shown at 9.

Adapted to be engaged with the shank or bar 4 of the hook is a substantially V-shaped hanger 10, on the upper ends of the sides of which are formed forwardly-projecting lugs 12, adapted to engage the upper sides of the flange or rib 2 of the beam. On the upper ends of the sides of the hanger 10 are also formed rearwardly-projecting lugs or shoulders 13, beneath which and between the obliquely-disposed wall 9 of the lug 8 and the adjacent edges of the hanger is adapted to be inserted a wedge-shaped key 14, by means of which the hanger is held in engagement with the flange or rib on the beam, thereby firmly supporting the shank or bar of the hook into close engagement with the under side of the beam, as shown. If desired, the narrow projecting end of the key 14 may be upset or bent to prevent the casual withdrawal of the key, as shown in dotted lines in Fig. 3.

In Fig. 4 of the drawings is shown a slightly-modified form of lugs 12 on the upper ends of the sides of the hanger. Said lugs are shown in this instance as being curved upwardly to conform to the shape of the flange or rib on the beam, which is shown in this instance as of a different construction to the flange shown in Figs. 1, 2, and 3.

In Fig. 7 is shown a slightly different form of the hook 3. In this instance the rear hook 7 is dispensed with or left off the bar 4.

In Fig. 8 is shown another form of the hook 3, the same being shown in this instance as provided with simply the rear hook 7, the forward or outer hook 6 being left off.

In Figs. 9, 10, and 11 of the drawings is shown a socket 15, said socket having a beam-engaging bar or shank 16, similar in construction to the shank 4 on the hook 3 and is adapted to be engaged with the under side of the flange on the beam in the same manner as said shank 4. The shank or bar 16 has formed on one or both ends rectangular sockets 17 and 18, the socket 17 being arranged at the outer end of the shank. The sides of the socket 17 project upwardly above the shank 16 and have their inner edges engaged with the outer flat side of the beam, as shown. The sides of the socket 18 on the rear end of the shank 16 also project upwardly above said shank, as shown. The inner edges of said upwardly-projecting sides of the socket 18 are cut or formed on an angle and are adapted to form stops, between which and the adjacent edge of a hanger 19 is adapted to be inserted a wedge-shaped key 20. The hanger 19 and the key 20 are similar in construction to the hanger and key employed in connection with the first figures of the drawings. Said hanger is provided with forwardly-projecting lugs 21, which engage the upper side of the rib or flange of the beam, and with rearwardly-projecting lugs 22, with which the upper side of the key 20 is engaged, thereby firmly supporting and holding the socket 18 in engagement with the beam.

In Figs. 12 and 13 of the drawings is shown an apertured bar or eye-bracket 23, consisting of a bar or shank 24, adapted to be engaged with the under side of the beam, as described in connection with the shanks of the former figures. On the outer end of the shank 24 is formed a head 25, having arranged therein an eye or aperture 26, through which is adapted to be inserted a supporting rod or bar, as shown. The head 25 is also provided on its inner side with an abrupt shoulder 27, adapted to engage the outer face of the beam, as shown. On the inner end of the shank 24 is formed an outwardly-projecting right-angular lug 28, having an obliquely-disposed inner wall 29, between which and the adjacent edge of a hanger 30 is adapted to be inserted a key 31, whereby said hanger is held in engagement with the flange of the beams. The hanger 30 is provided with forwardly and rearwardly projecting lugs 31 and 32, which are respectively adapted to engage the flange on the beam and the key 31. If desired, the inner end of the shank or bar 24 may be provided with an aperture 32, similar to the head 25 on the opposite end thereof and as shown in dotted lines in Fig. 12.

In using the form of bracket shown in Figs. 12 and 13 it will be understood that two or more of the same are employed to hold the supporting-rod, as hereinbefore described. It will be also understood that in using the socket support or bracket, as shown in Figs. 9, 10, and 11, said brackets are intended to be used in pairs and are to be arranged opposite to each other on the adjacent beams to support a cross-bar 33, the ends of which are disposed in the sockets of the opposite brackets, as will be understood, so that when a series of brackets and supports are employed a rack or shelf will be provided.

The various forms of the device as herein shown and described are particularly adapted for use in connection with the deck-supporting cross-beams of a vessel to provide means for supporting a swinging cot or hammock or to provide a rack, as shown in Figs. 9, 10, and 12, upon which life-preservers or other articles may be stored, or to provide supporting-brackets for rods forming hangers or racks for clothing or other purposes, said latter form of support being shown in Figs. 12 and 13 of the drawings.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A beam-attaching device for supporting brackets and hooks comprising a bracket or hook a substantially U-shaped hanger adapted to engage said supporting bracket or hook, beam-engaging lugs formed on the upper end of said hanger, a locking-lug formed on said hook or bracket, a key adapted to be inserted between said locking-lug and the adjacent side of said hanger, and means formed on said hanger to engage and hold said key in place, substantially as described.

2. A beam-attaching device for supporting hooks and brackets comprising a bracket or hook a substantially U-shaped hanger, a shank or beam engaging bar formed on said hook or bracket and adapted to be engaged by said hanger, beam-engaging lugs formed on the upper ends of the sides of the latter to engage the flange or rib on said beam, and a lock-lug formed on the inner end of said bar or shank, said lug having an obliquely-disposed inner edge, and a wedge-shaped key to lock said hanger in engagement with the flange on said beam, substantially as described.

3. A beam-attaching device for supporting hooks or brackets comprising a bracket or hook a substantially U-shaped hanger, a shank or beam engaging bar formed on said hook or bracket, a lug formed on the forward end of said shank to engage the flat surface of said beam, forwardly-projecting lugs formed on the upper end of said hanger to engage the flange or rib on said beam after said hanger has been engaged with said shank or bar, key-engaging lugs formed on and projecting from the opposite side of said hanger, a lug formed on the inner end of said bar or shank, and a wedge-shaped key adapted to be inserted between said lug and the adjacent edges of the hanger to lock the latter in engagement with the beam, substantially as described.

4. A beam-engaging bracket comprising a shank adapted to engage the lower side of the beam, supporting devices formed on said shank, a beam-engaging lug formed on one end of said shank to engage the outer face of the beam, a substantially U-shaped hanger adapted to be applied to the opposite end of the shank, forwardly-projecting lugs formed on said hanger to engage the flange or rib on said beam, and means to lock said hanger in firm engagement with the beam, thereby securely attaching said bracket thereto, substantially as described.

5. A beam-engaging bracket comprising a shank adapted to engage the lower side of the beam, supporting devices formed on said shank, a beam-engaging lug formed on one end of said shank to engage the outer face of the beam, a substantially U-shaped hanger adapted to be applied to the opposite end of the shank, forwardly-projecting lugs formed on said hanger to engage the flange or rib on said beam, key-engaging lugs formed on and projecting rearwardly from said hanger, a locking-lug formed on the inner end of said shank, said lug having an obliquely-disposed key-engaging surface, and a wedge-shaped locking-key to hold said hanger in engagement with said key, substantially as described.

In testimony whereof I have hereunto set my hand in presence of two subscribing witnesses.

WILLIAM HOUGHTON.

Witnesses:
   O. C. ROGERS,
   M. P. HILL.